US009902315B2

(12) United States Patent
Salter et al.

(10) Patent No.: US 9,902,315 B2
(45) Date of Patent: Feb. 27, 2018

(54) PHOTOLUMINESCENT LIGHTING APPARATUS FOR VEHICLES

(71) Applicant: Ford Global Technologies, LLC, Dearborn, MI (US)

(72) Inventors: Stuart C. Salter, White Lake, MI (US); Paul Kenneth Dellock, Northville, MI (US); Pietro Buttolo, Dearborn Heights, MI (US); Christopher Anthony Danowski, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/130,056

(22) Filed: Apr. 15, 2016

(65) Prior Publication Data

US 2017/0297482 A1    Oct. 19, 2017

(51) Int. Cl.
| | | |
|---|---|---|
| *B60Q 1/34* | (2006.01) | |
| *B60Q 1/26* | (2006.01) | |
| *B60Q 1/38* | (2006.01) | |
| *B60Q 1/54* | (2006.01) | |
| *B60Q 1/46* | (2006.01) | |
| *F21S 10/06* | (2006.01) | |

(52) U.S. Cl.
CPC ........... *B60Q 1/346* (2013.01); *B60Q 1/2696* (2013.01); *B60Q 1/382* (2013.01); *B60Q 1/46* (2013.01); *B60Q 1/54* (2013.01); *F21S 10/06* (2013.01)

(58) Field of Classification Search
CPC ...... B60Q 1/346; B60Q 1/2696; B60Q 1/382; B60Q 1/46; B60Q 1/54; F21S 10/06
See application file for complete search history.

(56) References Cited

U.S. PATENT DOCUMENTS

| | | |
|---|---|---|
| 2,486,859 A | 11/1949 | Meijer et al. |
| 5,053,930 A | 10/1991 | Benavides |
| 5,839,718 A | 11/1998 | Hase et al. |
| 6,031,511 A | 2/2000 | DeLuca et al. |
| 6,117,362 A | 9/2000 | Yen et al. |
| 6,188,317 B1 * | 2/2001 | Wang .................. B60Q 1/302 340/464 |
| 6,419,854 B1 | 7/2002 | Yocom et al. |
| 6,494,490 B1 | 12/2002 | Trantoul |
| 6,577,073 B2 | 6/2003 | Shimizu et al. |
| 6,737,964 B2 | 5/2004 | Samman et al. |

(Continued)

FOREIGN PATENT DOCUMENTS

| | | |
|---|---|---|
| CN | 204127823 U | 1/2015 |
| DE | 4120677 A1 | 1/1992 |

(Continued)

*Primary Examiner* — Mohamed Barakat
(74) *Attorney, Agent, or Firm* — Jason Rogers; Price Heneveld LLP (57) ABSTRACT

A vehicle illumination apparatus is disclosed. The apparatus comprises at least one light generating layer configured to conform to an outer surface of a panel of the vehicle. The light generating layer comprises a plurality of electrodes having a plurality of LEDs in a semiconductor ink disposed therebetween. The plurality of LEDs is operable to emit a first emission. The apparatus further comprises a controller configured to selectively activate the plurality of LEDs in response to a navigational direction of the vehicle.

16 Claims, 5 Drawing Sheets

(56) References Cited

U.S. PATENT DOCUMENTS

| | | |
|---|---|---|
| 6,820,888 B1 | 11/2004 | Griffin |
| 6,859,148 B2 | 2/2005 | Miller |
| 6,953,536 B2 | 10/2005 | Yen et al. |
| 7,015,893 B2 | 3/2006 | Li et al. |
| 7,161,472 B2 | 1/2007 | Strumolo et al. |
| 7,216,997 B2 | 5/2007 | Anderson, Jr. |
| 7,249,869 B2 | 7/2007 | Takahashi et al. |
| 7,482,916 B2 * | 1/2009 | Au ................ B60Q 1/34 340/475 |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 8,022,818 B2 | 9/2011 | la Tendresse et al. |
| 8,044,415 B2 * | 10/2011 | Messere ............ B32B 17/10 257/88 |
| 8,066,416 B2 | 11/2011 | Bucher |
| 8,097,843 B2 | 1/2012 | Agrawal et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,415,642 B2 | 4/2013 | Kingsley et al. |
| 8,519,359 B2 | 8/2013 | Kingsley et al. |
| 8,552,848 B2 | 10/2013 | Rao et al. |
| 8,664,624 B2 | 3/2014 | Kingsley et al. |
| 8,754,426 B2 | 6/2014 | Marx et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2001/0012206 A1 * | 8/2001 | Hayami ............ B60Q 1/085 362/464 |
| 2003/0167668 A1 | 9/2003 | Fuks et al. |
| 2004/0150613 A1 * | 8/2004 | Li ................ G09G 3/344 345/107 |
| 2005/0084229 A1 | 4/2005 | Babbitt et al. |
| 2006/0097121 A1 | 5/2006 | Fugate |
| 2007/0297045 A1 | 12/2007 | Sakai et al. |
| 2009/0217970 A1 | 9/2009 | Zimmerman et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2012/0104954 A1 | 5/2012 | Huang |
| 2012/0164796 A1 * | 6/2012 | Lowenthal ........ H01L 25/048 438/127 |
| 2012/0183677 A1 | 7/2012 | Agrawal et al. |
| 2012/0306368 A1 * | 12/2012 | Tatara ................ B60Q 1/18 315/81 |
| 2013/0092965 A1 | 4/2013 | Kijima et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 * | 9/2014 | Lowenthal ........... H01L 33/08 257/88 |
| 2015/0109602 A1 | 4/2015 | Martin et al. |
| 2015/0138789 A1 | 5/2015 | Singer et al. |
| 2015/0251665 A1 * | 9/2015 | Shenoy ............ B60W 50/00 701/1 |
| 2015/0267881 A1 | 9/2015 | Salter et al. |
| 2015/0336501 A1 * | 11/2015 | Desai ................ B60Q 1/12 362/36 |
| 2016/0102819 A1 | 4/2016 | Misawa et al. |
| 2016/0236613 A1 | 8/2016 | Trier |
| 2017/0158125 A1 | 6/2017 | Schuett et al. |

FOREIGN PATENT DOCUMENTS

| | | |
|---|---|---|
| KR | 20060026531 A | 3/2006 |
| WO | 2014161927 A1 | 10/2014 |

\* cited by examiner

PHOTOLUMINESCENT LIGHTING APPARATUS FOR VEHICLES

FIELD OF THE INVENTION

The present disclosure generally relates to a vehicle lighting apparatus, and more particularly, to a lighting apparatus for an emergency vehicle.

BACKGROUND OF THE INVENTION

Providing lighting for emergency vehicles may be implemented to provide various warnings and/or indications that an emergency vehicle is approaching. The disclosure provides for various embodiments of lighting systems that may improve safety, visibility, aesthetics, and/or features of the lighting for the emergency vehicles.

SUMMARY OF THE INVENTION

According to one aspect of the present disclosure, a vehicle illumination apparatus is disclosed. The apparatus comprises at least one light generating layer configured to conform to an outer surface of a panel of the vehicle. The light generating layer comprises a plurality of electrodes having a plurality of LEDs in a semiconductor ink disposed therebetween. The plurality of LEDs is operable to emit a first emission. The apparatus further comprises a controller configured to selectively activate the plurality of LEDs in response to a navigational direction of the vehicle.

According to another aspect of the present disclosure, an emergency light indicator for a vehicle is disclosed. The indicator comprises at least one light generating layer configured to conform to an outer surface of the vehicle. The light generating layer comprises a plurality of electrodes and a plurality of LEDs in a semiconductor ink disposed between the electrodes. The indicator further comprises an inertial measurement unit (IMU) and a controller. The controller is configured to selectively activate the plurality of LEDs in response to a directional signal from the IMU.

According to yet another aspect of the present disclosure, an emergency light indicator for a vehicle is disclosed. The indicator comprises at least one light generating layer configured to conform to an outer surface of the vehicle. The light generating layer comprises a plurality of electrodes and a plurality of LEDs in a semiconductor ink disposed between the electrodes. The indicator further comprises a steering sensor configured to identify a steering angle and a controller. The controller is configured to selectively activate the plurality of LEDs in response to the steering angle exceeding a predetermined threshold.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
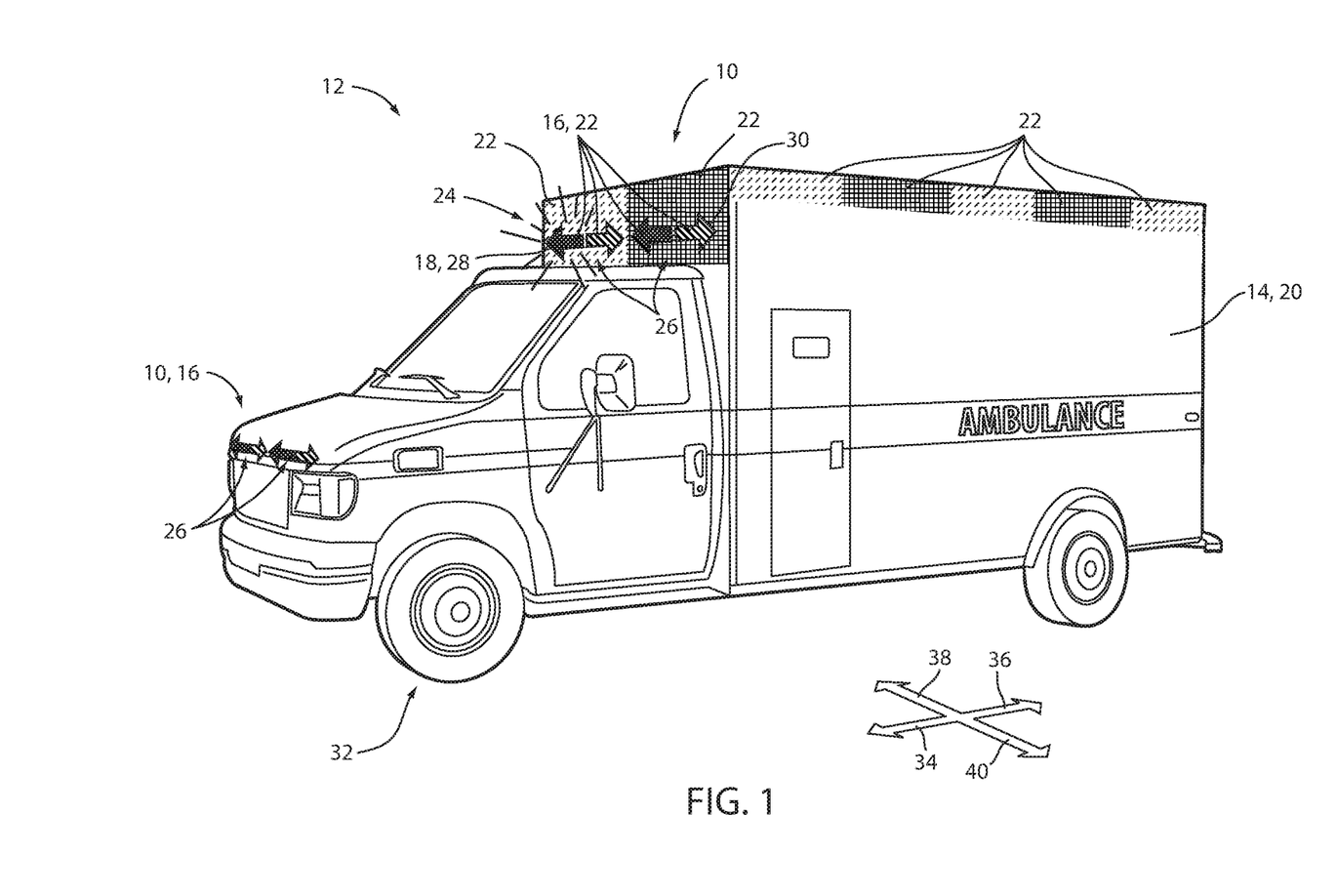
FIG. 1 is a front perspective view of an automotive vehicle comprising at least one illumination apparatus.
Figure 4A:
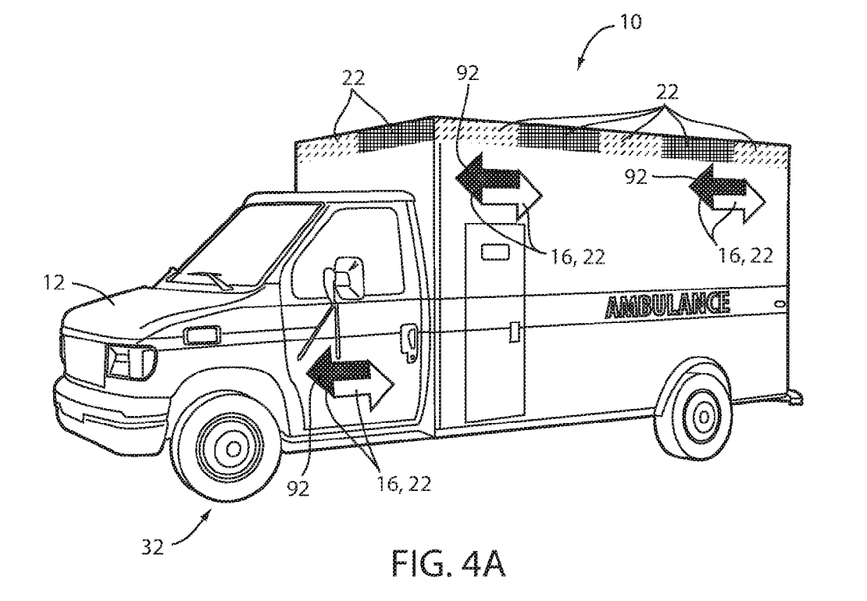
FIG. 4A is a front perspective view of an automotive vehicle demonstrating a directional indication via at least one illumination apparatus.
Figure 4B:
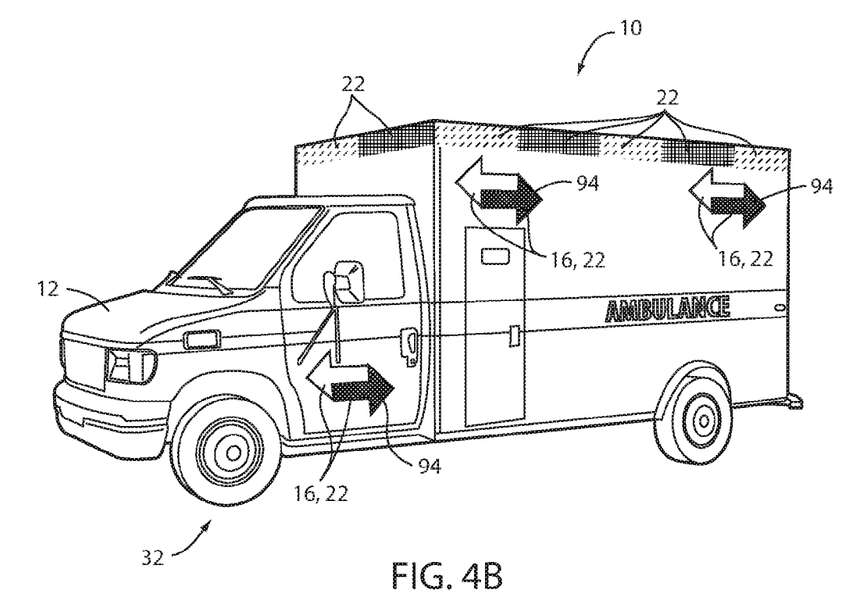
FIG. 4B is a front perspective view of an automotive vehicle demonstrating a directional indication via at least one illumination apparatus.

Referring to FIG. 1, the disclosure describes an illumination apparatus 10 for a vehicle 12. The vehicle 12 may correspond to an emergency vehicle, first response vehicle, and/or any vehicle that may utilize auxiliary warning lights. Accordingly, the illumination apparatus 10 may correspond to one or more indicator lights disposed on an outer surface or exterior surface 14 of the vehicle 12. As demonstrated in the exemplary embodiments of the application, the illumination apparatus 10 may be utilized to generate emissions of light in a variety of colors and may be utilized in various combinations to provide effective lighting for the vehicle 12. In some embodiments, the illumination apparatus 10 may correspond to a directional indicator 16, which may correspond to an arrow 18. The directional indicator 16 may further be configured as a bi-direction indicator as shown in FIGS. 4A and 4B.

In an exemplary embodiment, the illumination apparatus 10 may correspond to a substantially thin lighting assembly configured to be mounted to an exterior surface 14 of the vehicle 12. The exterior surface 14 may significantly align with a class-A surface of the vehicle 12. In this configuration, the illumination apparatus 10 may be configured to be mounted on the surface 14 without a conventional housing and also without a corresponding opening formed in at least one panel 20 of the vehicle 12. In some embodiments, the illumination apparatus 10 may be configured to be applied to one or more surfaces of the vehicle 12 that are substantially flush with class-A surfaces of the vehicle 12. Though specific examples are provided herein, the illumination apparatus 10 may be implemented in various interior and/or exterior panels of the vehicle 12 and may generally be configured to illuminate portions of the vehicle 12.

As referred to herein, a class-A surface of the vehicle 12 may correspond to an exposed surface that may typically be finished or painted. For example, a class-A surface may correspond to an exterior surface of any panel of the vehicle 12, which may be accessible to an onlooker of the vehicle 12. A class-A surface may conversely not ordinarily apply to an unfinished surface of the vehicle 12 configured to accommodate a housing or other features that may not be visible in an assembled configuration. Though discussed in reference to a class-A surface or finished surface, the illumination apparatus 10 and the various corresponding light producing assemblies described herein may be utilized in connection with various surfaces of the vehicle 12.

Each of a plurality of lighting portions or segments of the illumination apparatus 10 may correspond to a light producing assembly 22 corresponding to a thin, flexible lighting assembly. Each of the light producing assemblies 22 discussed herein may be configured to illuminate independently and may be configured to emit various colors of t light. Accordingly, exemplary embodiments of the illumination apparatus 10 are discussed in detail in the following description. For purposes of this disclosure, a vehicle fixture or panel may refer to any interior or exterior piece of vehicle equipment, or a part thereof, suitable for receiving the illumination apparatus 10 as described herein. While the embodiments of the illumination apparatus 10 described herein are primarily directed to automotive vehicle use, it should be appreciated that the apparatus or system may also be implemented in other types of vehicles designed to transport one or more passengers such as, but not limited to, watercraft, aircraft, trains, mass transit, etc.

In some embodiments, the illumination apparatus 10 may comprise a controller configured to selectively illuminate each of a plurality of light producing assemblies 22 in response to one or more signals received from one or more sensors, vehicle modules, and/or inputs. For example, in some embodiments, the controller 102 may be configured to selectively activate the one or more of the light producing assemblies 22 (e.g. the arrow 18) to produce an output emission 24 of light in response to a navigational direction of the vehicle 12. In such an example, the illumination apparatus 10 may form an indicator 26 configured to communicate a navigation direction of the vehicle 12. The indicator 26 may be in the form of a directional indicator (e.g. an arrow, triangle, pointer, etc.). In this way, the controller may be configured to communicate a direction that the vehicle 12 is navigating, or is expected to navigate in the future in order to apprise nearby motorists how best to clear a path for the vehicle 12. The controller of the illumination apparatus 10 is discussed further in reference to FIG. 5.

In response to the one or more sensors, vehicle modules, and/or inputs, the controller may be configured to activate a first directional indicator 28 or a second directional indicator 30, which may correspond to the navigational direction of the vehicle 12. For example, the controller may be configured to receive a directional input from at least one of a steering sensor, an inertial sensor, a navigational system (e.g. a satellite navigation system), etc. Based on the directional input, the controller may selectively activate a corresponding directional indication of the first directional indicator 28 or the second directional indicator 30. In this configuration, the illumination apparatus 10 may be applied for various applications to communicate the navigational direction of the vehicle 12.

In some embodiments, the controller may be configured to activate the first directional indicator 28 or the second directional indicator 30 in response to a directional signal exceeding a first threshold. For example, the controller may be in communication with a steering sensor configured to communicate a steering angle of the vehicle 12. The first threshold may correspond to a steering angle of a steering system, for example a steering direction of a steering mechanism configured to angle the front wheels 32 of the vehicle 12 relative to a fore-direction 34 and an aft-direction 36 of the vehicle 12. In this configuration, the controller may selectively activate the first directional indicator 28 in response to receiving a steering angle in a first direction 38 (e.g. right) exceeding the first threshold. Similarly, the controller may selectively activate the second directional indicator 30 in response to receiving a steering angle in a second direction 40 (e.g. left) exceeding the first threshold. In this configuration, the controller may be configured to selectively illuminate the first directional indicator 28 or the second directional indicator 30 to communicate a navigational direction of the vehicle 12.

Figure 2:
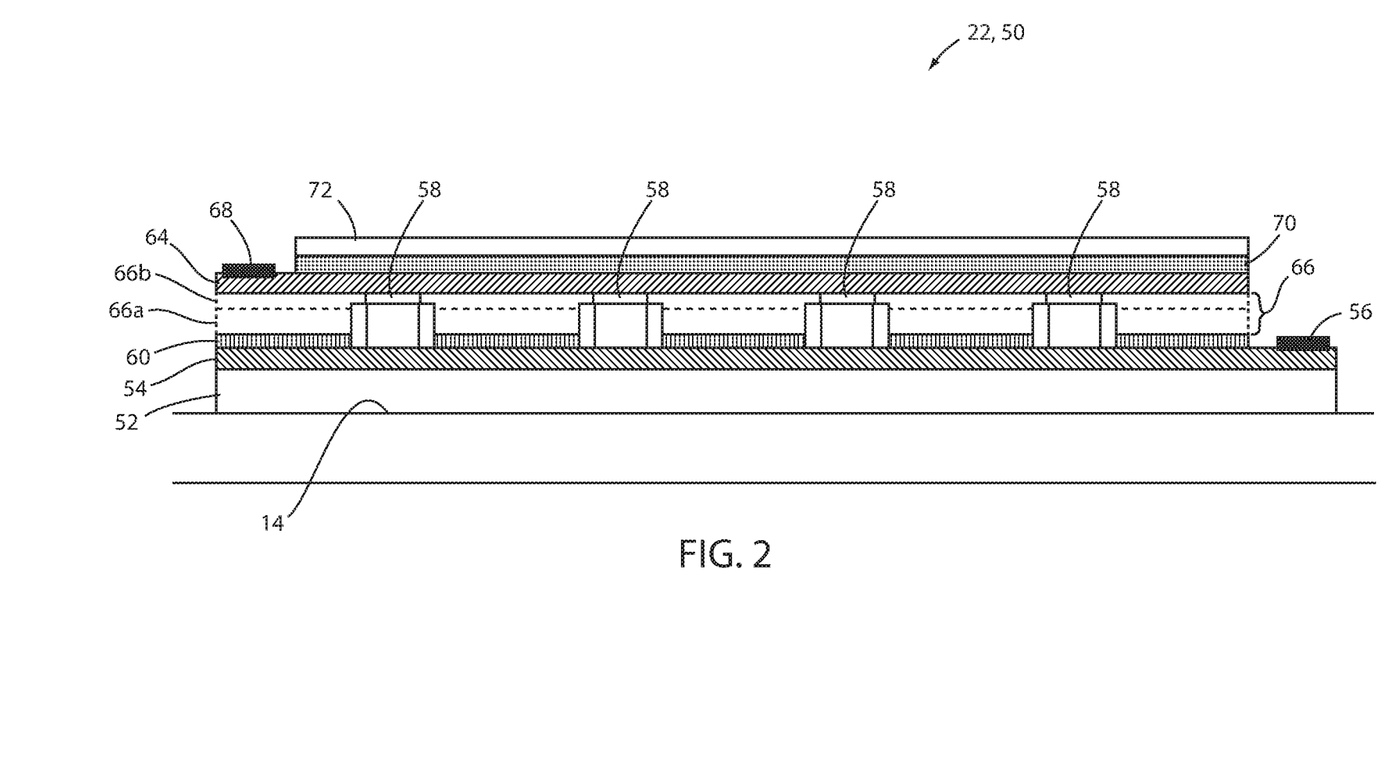
FIG. 2 is a detailed side view of a light producing assembly.

Referring to FIG. 2, the light producing assembly 22 may correspond to a thin-film or printed light emitting diode (LED) assembly. The light producing assembly 22 may comprise a circuit 50 having a substrate 52. The substrate 52 may be opaque, transparent, or semi-transparent and may be thin. The light producing assembly 22 may be utilized in a variety of applications, which may have a thin overall thickness. The substrate 52 may be of a polymer, for example polycarbonate, poly-methyl methacrylate (PMMA), polyethylene terephthalate (PET), etc. In some embodiments, the substrate 52 may be dispensed from a roll to provide for integration into assembly operations for the light producing assembly 22 and may be approximately 0.1 mm to 1.5 mm thick.

A first electrode 54 or conductive layer may be disposed on the substrate 52. The first electrode 54 and/or various electrodes or conductive layers discussed herein may comprise a conductive epoxy, such as a silver-containing or copper-containing epoxy. The first electrode 54 may be conductively connected to a first bus bar 56. The first bus bar 56 and other bus bars or conduits discussed herein may be of metallic and/or conductive materials, which may be screen printed on the electrodes or conductive layers. The bus bars may be utilized in the light producing assembly 22 to conductively connect a plurality of light-emitting diode (LED) sources 58 to a power source via the controller. In this way, the first bus bar 56, and other bus bars utilized in the light producing assembly, may be configured to uniformly deliver current along and/or across a surface of the light producing assembly 22.

The LED sources 58 may be printed, dispersed or otherwise applied to the first electrode 54 via a semiconductor ink 60. The semiconductor ink 60 may correspond to a liquid suspension comprising a concentration of LED sources 58 dispersed therein. The concentration of the LED sources may vary based on a desired emission intensity of the light producing assembly 22. The LED sources 58 may be dispersed in a random or controlled fashion within the semiconductor ink 60. The LED sources 58 may correspond to micro-LEDs of gallium nitride elements, which may be approximately 5 microns to 400 microns across a width substantially aligned with the surface of the first electrode 54. The semiconductor ink 60 may include various binding and dielectric materials including but not limited to one or more of gallium, indium, silicon carbide, phosphorous and/or translucent polymeric binders. In this configuration, the semiconductor ink 60 may contain various concentrations of LED sources 58 such that a surface density of the LED sources 58 may be adjusted for various applications.

In some embodiments, the LED sources 58 and semiconductor ink 60 may be sourced from Nth Degree Technologies Worldwide Inc. The semiconductor ink 60 can be applied through various printing processes, including ink jet and silk screen processes to selected portion(s) of the substrate 52. More specifically, it is envisioned that the LED sources 58 may be dispersed within the semiconductor ink 60, and shaped and sized such that a substantial quantity of them preferentially align with the first electrode 54 and a second electrode 64 during deposition of the semiconductor ink 60. The portion of the LED sources 58 that ultimately are electrically connected to the electrodes 54, 64 may be illuminated by a voltage source applied across the first electrode 54 and the second electrode 64. In some embodiments, a power source derived from a vehicular power source may be employed as a power source to supply current to the LED sources 58. Additional information regarding the construction of a light producing assembly similar to the light producing assembly 22 is disclosed in U.S. Pat. No. 9,299,887 to Lowenthal et al., entitled "ULTRA-THIN PRINTED LED LAYER REMOVED FROM SUBSTRATE," filed Mar. 12, 2014, the entire disclosure of which is incorporated herein by reference.

At least one dielectric layer 66 may be printed over the LED sources 58 to encapsulate and/or secure the LED sources 58 in position. The at least one dielectric layer 66 may correspond to a first dielectric layer 66a and a second dielectric layer 66b, which may be of a substantially transparent material. The second electrode 64 may correspond to a top transparent conductive layer printed over the dielectric layer 66 to electrically connect the electrodes 54, 64. The second electrode 64 may be conductively connected to a second bus bar 68. The bus bars 56, 68 may be utilized in the light producing assembly 22 to conductively connect a plurality of LED sources 58 to the power source via the controller. Though the plurality of LED sources 58 are discussed as connected to the controller via the bus bars 56, 68, in some embodiments, the controller may supply current to the LED sources 58 via various forms of conductive leads or traces configured to conductively connect the controller to the first electrode 54 and the second electrode 64. An exemplary embodiment of the controller is discussed in reference to FIG. 5.

In some embodiments, the first electrode 54 and the second electrode 64 may correspond to an anode electrode and a cathode electrode. Though described as an anode and a cathode of the light producing assembly 22, the first electrode 54 and the second electrode 64 may be arranged such that the second electrode 64 (cathode) is disposed on the substrate and the first electrode 54 (anode) is disposed on the at least one dielectric layer 66. Additionally, a reflective layer which may be of a metallic reflective material may be disposed between the substrate 52 and the first electrode 54 to reflect light emitted from the cathode outward from the substrate 52 through the second electrode 64. The bus bars 56, 68 may be printed along opposite edges of the electrodes 54, 64 and electrically terminate at anode and cathode terminals. Points of connection between the bus bars 56, 68 and the power source may be at opposite corners of each bus bar 56, 68 for uniform current distribution along each bus.

Still referring to FIG. 2, in some embodiments, a photoluminescent layer 70 may be applied to the second electrode 64 to form a backlit configuration of the light producing assembly 22. In some embodiments, the photoluminescent layer 70 may alternatively or additionally be configured in a front-lit configuration. The photoluminescent layer 70 may be applied as a coating, layer, film, and/or photoluminescent substrate to the second electrode 64 or any surface of the light producing assembly 22 configured to emit the output emission 24 therethrough. The photoluminescent layer 70 may be applied by screen printing, flexography, and/or otherwise affixed to the second electrode 64 or a portion of a fixture or panel of the vehicle 12.

In various implementations, the LED sources 58 may be configured to emit an excitation emission comprising a first wavelength corresponding to blue light. The LED sources 58 may be configured to emit the excitation emission into the photoluminescent layer 70 such that the photoluminescent material becomes excited. In response to the receipt of the excitation emission, the photoluminescent material converts the excitation emission from the first wavelength to the output emission 24 comprising at least a second wavelength longer than the first wavelength. Additionally, one or more coatings 72 or sealing layers may be applied to an exterior surface of the light producing assembly 22 to protect the photoluminescent layer 70 and various other portions of the light producing assembly 22 from damage and wear.

Figure 3:
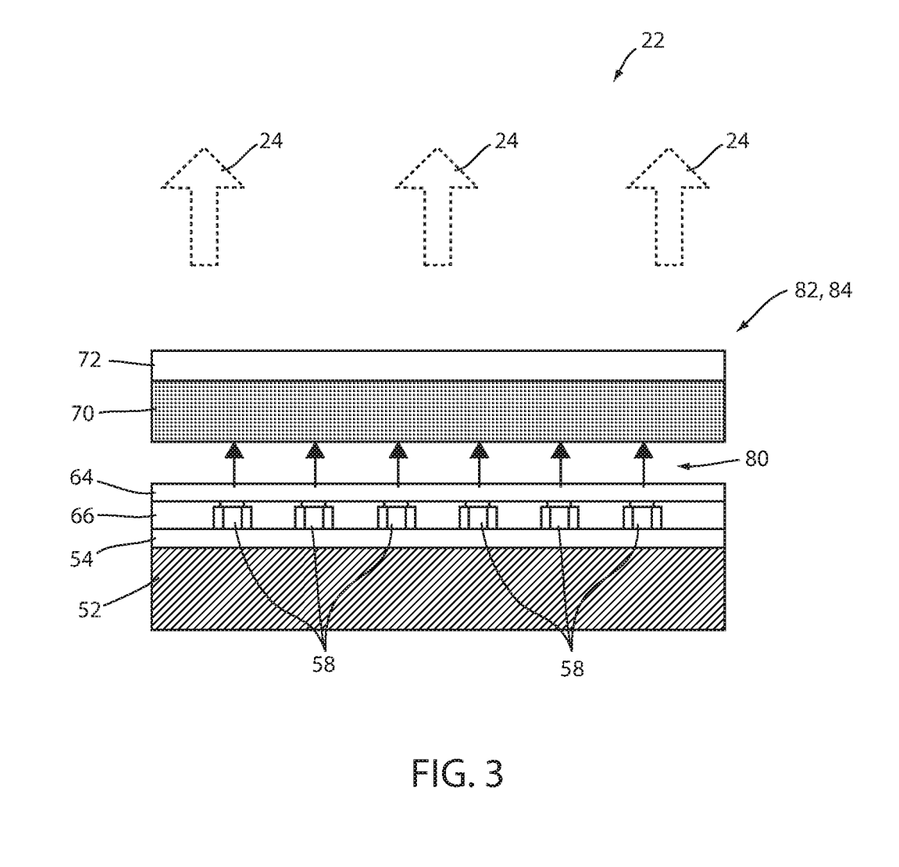
FIG. 3 is a side schematic view of a light producing assembly demonstrating a photoluminescent layer configured to convert a wavelength of light.

Referring now to FIG. 3, a detailed view of photoluminescent layer 70 of the light producing assembly 22 in a backlit configuration is shown. The light producing assembly 22 is configured similar to the light producing assembly 22 demonstrated in FIG. 2, with like-numbered elements having the same or comparable function and structure. Though not shown in FIG. 3, the LED sources 58 are in electrical communication with the bus bars 56, 68 and a power source via the controller such that the controller may selectively activate an excitation emission 80 from LED sources 58.

In an exemplary implementation, the excitation emission 80 may comprise a first wavelength corresponding to a blue, violet, and/or ultra-violet spectral color range. The blue spectral color range comprises a range of wavelengths generally expressed as blue light (~440-500 nm). In some implementations, the first wavelength may comprise a wavelength in the ultraviolet and near ultraviolet color range (~100-450 nm). In an exemplary implementation, the first wavelength may be approximately equal to 470 nm. Though particular wavelengths and ranges of wavelengths are discussed in reference to the first wavelength, the first wavelength may generally be configured to excite any photoluminescent material.

In operation, the excitation emission 80 is transmitted into an at least partially light transmissive material of the photoluminescent layer 70. The excitation emission 80 is emitted from the LED sources 58 and may be configured such that the first wavelength corresponds to at least one absorption wavelength of one or more photoluminescent materials disposed in the photoluminescent layer 70. For example, the photoluminescent layer 70 may comprise an energy conversion layer 82 configured to convert the excitation emission 80 at the first wavelength to an output emission 24 having a second wavelength, different from the first wavelength. The output emission 24 may comprise one or more wavelengths, one of which may be longer than the first wavelength. The conversion of the excitation emission 80 to the output emission 24 by the energy conversion layer 82 is referred to as a Stokes shift.

In some embodiments, the output emission 24 may correspond to a plurality of wavelengths. Each of the plurality of wavelengths may correspond to significantly different spectral color ranges. For example, the at least second wavelength of the output emission 24 may correspond to a plurality of wavelengths (e.g. second, third, etc.). In some implementations, the plurality of wavelengths may be combined in the output emission 24 to appear as substantially white light. The plurality of wavelengths may be generated by a red-emitting photoluminescent material having a wavelength of approximately 620-750 nm, a green emitting photoluminescent material having a wavelength of approximately 526-606 nm, and a blue or blue green emitting photoluminescent material having a wavelength longer than the first wavelength $\lambda_1$ and approximately 430-525 nm. In some implementations, a blue or blue green wavelength may correspond to the excitation emission being combined with the output emission 24. As discussed herein, a concentration of the photoluminescent material may be configured to allow at least a portion of the excitation emission 80 to be emitted with the output emission 24 to add a blue hue to the output emission 24. The plurality of wavelengths may be utilized to generate a wide variety of colors of light from the each of the photoluminescent portions converted from the first wavelength. Though the particular colors of red, green, and blue are referred to herein, various photoluminescent materials may be utilized to generate a wide variety of colors and combinations to control the appearance of the output emission 24.

The photoluminescent materials, corresponding to the photoluminescent layer 70 or the energy conversion layer 82, may comprise organic or inorganic fluorescent dyes configured to convert the excitation emission 80 to the output emission 24. For example, the photoluminescent layer 70 may comprise a photoluminescent structure of rylenes, xanthenes, porphyrins, phthalocyanines, or other materials suited to a particular Stokes shift defined by an absorption range and an emission fluorescence. In some embodiments, the photoluminescent layer 70 may be of at least one inorganic luminescent material selected from the group of phosphors. The inorganic luminescent material may more particularly be from the group of Ce-doped garnets, such as YAG:Ce. As such, each of the photoluminescent portions may be selectively activated by a wide range of wavelengths received from the excitation emission 80 configured to excite one or more photoluminescent materials to emit an output emission having a desired color.

Still referring to FIG. 3, the light producing assembly 22 may further include the coating 72 as at least one stability layer configured to protect the photoluminescent material contained within the energy conversion layer 82 from photolytic and/or thermal degradation. The stability layer may be configured as a separate layer optically coupled and adhered to the energy conversion layer 82. The stability layer may also be integrated with the energy conversion layer 82. The photoluminescent layer 70 and/or the one or more coatings 72 may also include a protection layer optically coupled and adhered to the stability layer or any layer or coating to protect the photoluminescent layer 70 from physical and chemical damage arising from environmental exposure.

The stability layer and/or the protection layer may be combined with the energy conversion layer 82 to form an integrated photoluminescent structure 84 through sequential coating or printing of each layer, or by sequential lamination or embossing. Additionally, several layers may be combined by sequential coating, lamination, or embossing to form a substructure. The substructure may then be laminated or embossed to form the integrated photoluminescent structure 84. Once formed, the photoluminescent structure may be applied to a surface of at least one of the electrodes 54, 64 such that the excitation emission 80 received from the LED sources 58 may be converted to the output emission 24. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference.

Referring now to FIGS. 4A and 4B, a front perspective view of the vehicle 12 is shown demonstrating an embodiment of the illumination apparatus 10 configured to communicate a navigation direction of the vehicle 12. In some embodiments, the illumination apparatus 10 may be configured to selectively illuminate to identify that the vehicle 12 is moving in the fore-direction 34 by lighting a third directional indicator 92 and the aft-direction 36 by lighting a fourth directional indicator 94. The directional indications 92 and 94 may be controlled by the controller in response to a signal from one or more sensors in communication therewith. For example, the controller may selectively activate the third directional indicator 92 or the fourth directional indicator 94 in response to an input from a steering sensor, an inertial measurement unit (IMU), a navigation system (GPS navigational system), etc. The controller and various corresponding inputs and sensors/devices are further discussed in reference to FIG. 5.

For example, as illustrated in FIG. 4A, the illumination apparatus 10 is shown activating the third directional indicator 92 in response to the controller receiving a navigation signal identifying that the vehicle 12 is moving and/or accelerating in the fore-direction 34. The navigation signal may correspond to an input to the controller from the IMU or navigation system identifying a motion, acceleration, or pending navigational instruction of the vehicle 12. In this configuration, the controller may be configured to selectively illuminate the third directional indicator 92 of the illumination apparatus 10 to communicate a heading, velocity, acceleration, or various motion or navigational data associated with the vehicle 12.

As illustrated in FIG. 4B, the illumination apparatus 10 may be shown activating the fourth directional indicator 94 in response to the controller receiving a navigation signal identifying that the vehicle 12 is moving and/or accelerating in the aft-direction 36. The navigation signal may correspond to an input to the controller from the IMU or navigation system identifying a motion, acceleration, or pending navigational instruction of the vehicle 12. In this configuration, the controller may also be configured to selectively illuminate the fourth directional indicator 94 of the illumination apparatus 10 to communicate a heading, velocity, acceleration, or various motion or navigational data associated with the vehicle 12.

In some embodiments, the controller may further be configured to receive speed, acceleration, or deceleration data for the vehicle 12 (generally referred to as speed data hereinafter). The speed data may be received from one or more sensors in communication with the controller via a communication bus of the vehicle 12. Examples of sensors and inputs in communication with the controller are discussed in further detail in reference to FIG. 5. In response to the speed data increasing or having a high rate, a frequency a strobe effect of the output emission 24 emitted from one or more of the light producing assemblies 22 may increase. Additionally, the frequency of the strobe effect of the output emission 24 may decrease in response to the speed data having a low rate or decreasing. The controller may identify various corresponding rates and thresholds at which to adjust the frequency of the output emission 24. In this configuration, the controller may be configured to communicate a relative speed of the vehicle 12 by controlling the strobe or flashing rates of the output emissions 24 from the light producing assemblies 22.

Referring again to FIG. 1, the controller may also be configured to control the first directional indicator 28 or the second directional indicator 30 in response to the navigational data. Though discussed previously in reference to the steering data from the steering sensor, the controller may also be configured to control and selectively activate the first directional indicator 28 or the second directional indicator 30 in response to navigational data. For example, the controller may selectively activate the first directional indicator 28 or the second directional indicator 30 in response to a signal from the IMU identifying a change in acceleration in the first direction 38 or the second direction 40. Additionally, the controller may activate the first directional indicator 28 or the second directional indicator 30 in response to a signal from the navigational system that the vehicle 12 is approaching a turn in the first direction 38 or the second direction 40. In this way, the illumination apparatus 10 may be configured to visually communicate navigational directions, velocity, acceleration, and any related changes, etc. to onlookers such as operators of nearby vehicles.

Figure 5:
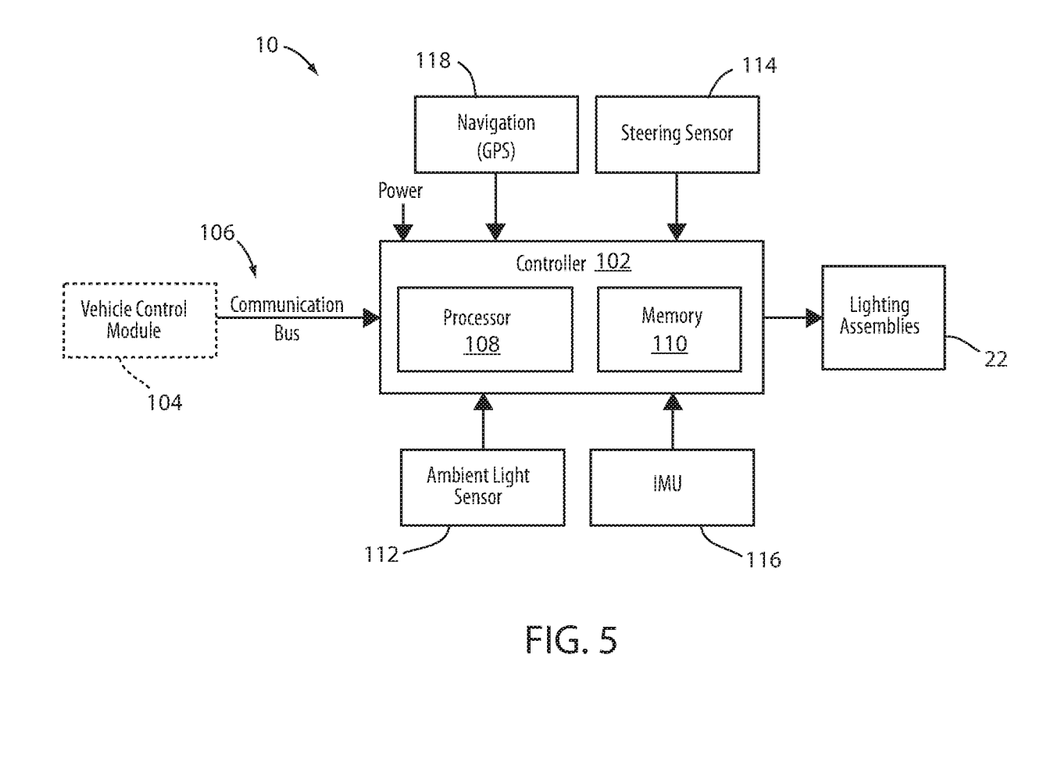
FIG. 5 is a block diagram of a lighting apparatus in accordance with the disclosure.

Referring to FIG. 5, a block diagram corresponding to the illumination apparatus 10 is shown. The controller 102 may be in communication with the light producing assemblies 22, via the bus bars 56 and 68 discussed herein. The controller 102 may be in communication with the vehicle control module 104 via a communication bus 106 of the vehicle 12. The communication bus 106 may be configured to deliver signals to the controller 102 identifying various vehicle states. For example, the communication bus 106 may be configured to communicate to the controller 102 a drive selection of the vehicle 12, an ignition state, a door open or ajar status, a lighting state, a braking condition, vehicle velocity or speed, a remote activation of the illumination apparatus 10, or any other information or control signals that may be utilized to activate one or more of the light producing assemblies 22 of the illumination apparatus 10. Though the controller 102 is discussed herein, in some embodiments, at least a portion of the illumination apparatus 10 may be activated in response to an electrical or electro-mechanical switch of the vehicle 12.

The controller 102 may comprise a processor 108 comprising one or more circuits configured to receive the signals from the communication bus 106 and output signals to control the illumination apparatus 10 to control the various output lights, emissions, indications, etc. as discussed herein. The processor 108 may be in communication with a memory 110 configured to store instructions to control the activation of the illumination apparatus 10. The controller 102 may further be in communication with an ambient light sensor 112. The ambient light sensor 112 may be operable to communicate a light condition, for example a level brightness or intensity of the ambient light proximate the vehicle 12. In response to the level of the ambient light, the controller 102 may be configured to adjust a light intensity of the output emission 24 from each of the light producing assemblies, layers, emitters, and/or light source discussed herein. The intensity of the light output from the illumination apparatus 10 may be adjusted by the controller 102 by controlling a duty cycle, current, or voltage supplied to the illumination apparatus 10.

As discussed herein, the controller 102 may be in communication with one or more of a steering sensor 114, an inertial measurement unit (IMU) 116, a navigation system 118, etc. The steering sensor 114 may correspond to a steering angle detection apparatus, which may be incorporated as a module of a power steering system of the vehicle 12. The steering angle may be detected by the steering sensor 114 via various sensory devices, for example a potentiometer, angular encoder, and various forms of sensors that may be in communication with the controller 102. Accordingly, the controller 102 may be configured to selectively activate one or more of the light producing assemblies 22 in response to a steering angle of the vehicle 12.

The IMU 116 may correspond to one or more accelerometers, gyroscopes, and various other forms of sensors operable to detect motion or navigational data of the vehicle 12. Such devices may be configured to a detect directions and magnitudes of forces acting on the vehicle 12 along various axes, for example in the first direction 38 (e.g. right), second direction 40 (e.g. left), the fore-direction 34, and the aft-direction 36. Accordingly, the controller may be configured to activate each of the first directional indicator 28, the second directional indicator 30, the third directional indicator 92, and the fourth directional indicator 94 to selectively communicate a navigation direction of the vehicle 12.

The navigation system 118 may correspond to a globally positioning system (GPS) based navigational device configured to identify a heading of the vehicle. Additionally, the navigation system 118 may be configured to be programmed to identify one or more pending navigational directions (e.g. future turns) of the vehicle 12. The navigation system 118 may communicate such navigation data to the controller 102 such that the controller 102 may selectively activate the each of the first directional indicator 28, the second directional indicator 30, the third directional indicator 92, and the fourth directional indicator 94 to communicate the pending or future navigation direction of the vehicle 12.

As described herein, the illumination apparatus 10 may be configured in various ways to communicate navigational data regarding the current speed, direction, and/or acceleration of the vehicle 12. Additionally, or alternatively, the illumination apparatus 10 may be configured to communicate one or more pending navigational instructions. The various embodiments may generally provide for a visual communication system configured to communicate the behavior of the vehicle 12 to operators of vehicles nearby.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle illumination apparatus comprising:
   at least one light generating layer configured to conform to an outer surface of a panel comprising:
   a plurality of electrodes;
   a plurality of LEDs dispersed in a semiconductor ink disposed between the electrodes operable to emit a first emission; and a controller configured to:
  receive a speed signal configured to indicate the speed of the vehicle;
  selectively activate the plurality of LEDs in response to a navigational direction of the vehicle exceeding a first threshold or a second threshold; and
  apply the first threshold in response to identifying the speed less than the predetermined speed and apply the second threshold in response to the speed exceeding the predetermined speed.

2. The illumination apparatus according to claim 1, wherein the navigational direction is determined in response to a directional input to the controller.

3. The illumination apparatus according to claim 2, wherein the directional input corresponds to a steering angle from a steering sensor.

4. The illumination apparatus according to claim 2, wherein the directional input corresponds to a directional signal from an inertial measurement unit.

5. The illumination apparatus according to claim 2, wherein the directional input corresponds to a pending navigation instruction from a navigation system.

6. The illumination apparatus according to claim 1, wherein the light generating layer forms an indicator shape corresponding to an arrow.

7. The illumination apparatus according to claim 1, wherein the light generating layer further comprises:
  at least one photoluminescent layer proximate to at least one of the electrodes configured to convert the first emission to a second emission corresponding to a different color of light than the first emission.

8. The illumination apparatus according to claim 1, wherein the semiconductor comprises a liquid suspension comprising a concentration of the LEDs dispersed therein.

9. The illumination apparatus according to claim 8, wherein the plurality of LEDs are applied to one of the electrodes via a printing delivery process, wherein the LEDs are dispersed in the semiconductor ink.

10. An emergency light indicator for a vehicle comprising:
  at least one light generating layer configured to conform to an outer surface of the vehicle comprising:
    a plurality of electrodes;
    a plurality of LEDs in a semiconductor ink disposed between the electrodes;
  an inertial measurement unit (IMU); and
  a controller configured to:
    selectively activate the plurality of LEDs in response to a directional signal from the IMU;
    activate the plurality of LEDs to output an emission in response to the directional signal exceeding a first threshold;
    receive a speed signal configured to indicate the speed of the vehicle; and
    change from the first threshold to a second threshold in response to the speed signal indicating the speed has exceeded a predetermined speed.

11. The light indicator according to claim 10, wherein the first threshold corresponds to a lower directional signal magnitude than the second threshold.

12. The light indicator according to claim 10, wherein the at least one light generating layer corresponds to a plurality of directional indicators.

13. The light indicator according to claim 12, wherein the plurality of directional indicators is configured to indicate an operating direction of the vehicle in the fore and aft directions.

14. The light indicator according to claim 12, wherein the plurality of directional indicators is configured to indicate a turning direction of the vehicle in the left and right directions.

15. An emergency light indicator for a vehicle comprising:
  at least one light generating layer configured to conform to an outer surface of the vehicle comprising:
    a plurality of electrodes;
    a plurality of LEDs in a semiconductor ink disposed between the electrodes;
  a steering sensor configured to identify a steering angle; and
  a controller configured to:
    receive a speed signal configured to indicate the speed of the vehicle;
    selectively activate the plurality of LEDs in response to the steering angle exceeding a first threshold or a second threshold; and
    apply the first threshold in response to identifying the speed less than the predetermined speed and apply the second threshold in response to the speed exceeding the predetermined speed.

16. The light indicator according to claim 15, wherein the first threshold corresponds to a lower steering angle magnitude than the second threshold.

* * * * *